UNITED STATES PATENT OFFICE.

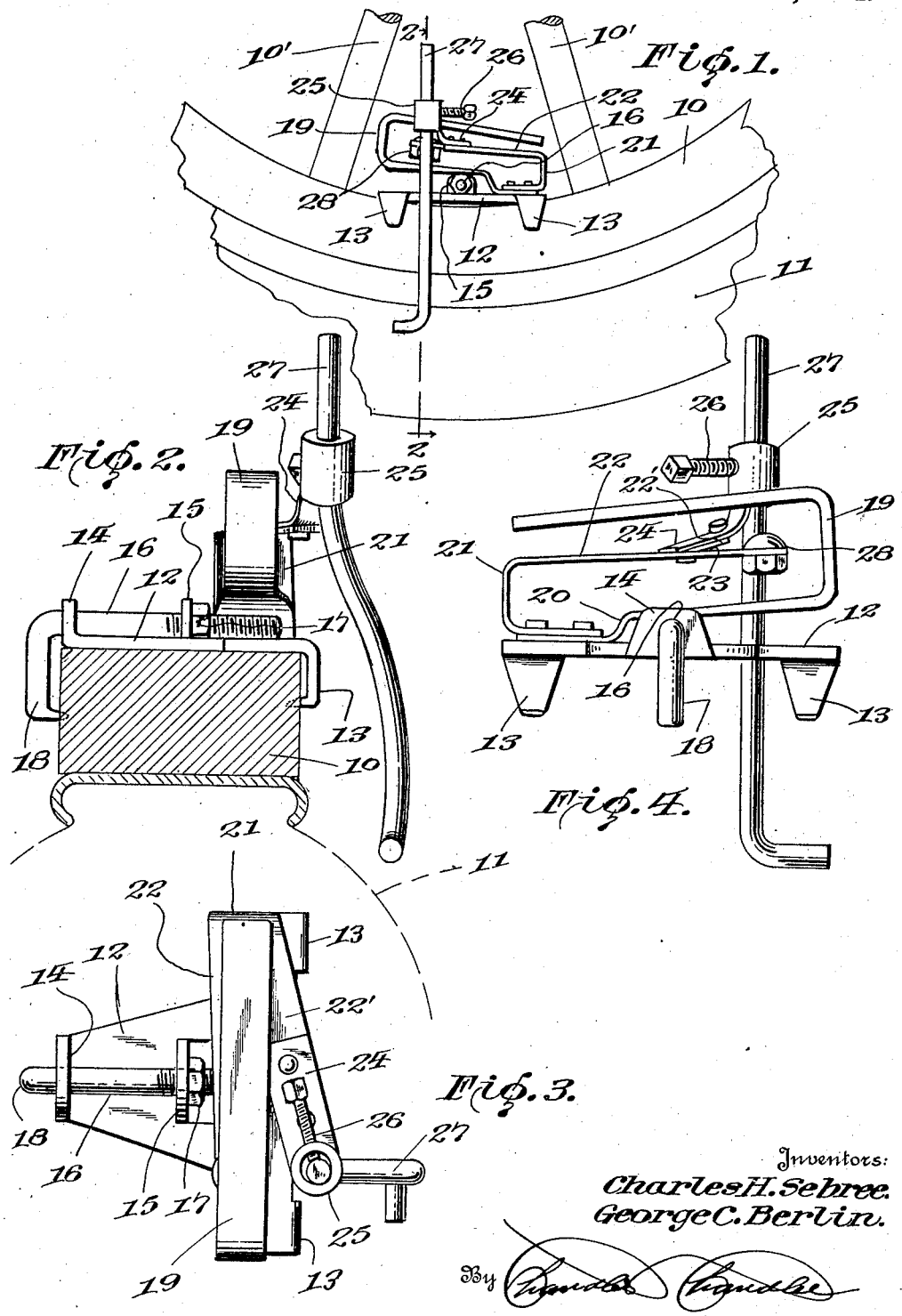

CHARLES H. SEBREE AND GEORGE C. BERLIN, OF CALDWELL, IDAHO.

DEFLATION-ALARM FOR TIRES.

1,394,364.  Specification of Letters Patent.  Patented Oct. 18, 1921.

Application filed April 1, 1921. Serial No. 457,738.

*To all whom it may concern:*

Be it known that we, CHARLES H. SEBREE and GEORGE C. BERLIN, citizens of the United States, residing at Caldwell, in the county of Canyon, State of Idaho, have invented certain new and useful Improvements in Deflation-Alarms for Tires; and we do hereby declare the following to be a full, clear, and exact description of the invention, such as will enable others skilled in the art to which it appertains to make and use the same.

This invention relates to new and useful improvements in signals and particularly to signals for automobiles for indicating the deflation of a tire.

The invention has for one of its objects the provision of a signaling device for a pneumatic tire which has a clamp adaptable for rims or fellies of different sizes and types.

Another object is to provide a novel audible signal which will be sounded every time the wheel makes a complete revolution, and of such loudness and distinctive sound as to be readily detected by the occupants of the automobile, above the ordinary sounds emitted from the engine and other parts of the automobile.

A further object is to provide a means arranged to actuate a clapper which is adjustable to strike against a gong or triangle at predetermined degrees of deflation of the tire.

Other objects and advantages will be apparent from the following description when taken in connection with the accompanying drawing.

In the drawing:

Figure 1 is a side elevation of a portion of an automobile wheel showing the invention applied thereto.

Fig. 2 is an enlarged vertical transverse sectional view taken on the line 2—2 of Fig. 1, showing the invention in elevation.

Fig. 3 is a top plan view of the invention.

Fig. 4 is a side elevation of the invention viewed from the side opposite to that shown in Fig. 1, to better show the audible signal or gong.

Referring particularly to the accompanying drawing, 10 represents a portion of the felly and 11 a portion of the tire of an automobile wheel, in connection with which the invention is adapted for use.

A substantially T-shaped plate 12 is disposed across the inner face of the felly, between a pair of spokes 10' of the wheel, the outer edge portion of the head of which has the prongs or tangs 13 bent to bite into the side face of the felly. Struck up from the outer end of the leg of the T-shaped plate is an apertured lug 14, while a second apertured lug 15 is struck up from the inner end portion of the leg. A bolt 16 is disposed through these alining lugs 14 and 15, and has engaged on its threaded portion a nut 17 which bears against the face of the inner lug 15 remote from the lug 14, while the other or outer end of the bolt is bent angularly to form a prong or tang 18, which bites in the adjacent side face of the felly. By turning the nut 17 in one direction the plate will be firmly clamped on the felly.

Secured to one end of the head of the plate 12, and extending longitudinally thereover, is a substantially U-shaped member 19, the same having the attached portion offset downwardly, as shown at 20, to permit the remaining portion of the arm thereof to rise above the bolt 16.

A second U-shaped strip 21 has its shorter arm secured at the same point as that of the member 19, its longer arm 22 extending centrally between the arms of the member 19. The said arm 22 is longitudinally bifurcated, as shown at 23, to provide the furcations one of which, 22' extends obliquely away from the other one and lies with its greater part outwardly of the member 19. A bracket 24 is secured to the outer end of this portion 22' and has the vertically disposed eye 25 carrying a clamping screw 26. Disposed for vertical slidable adjustment in the eye 25 is a rod 27, the lower end of which is bent angularly and is adapted to engage with the tire when the tire becomes deflated, and whereby said rod will be pushed inwardly by the tire. On the portion of the arm 22 which lies within the member 19 there is secured a knob or projection 28 which is adapted to strike against the inner face of the outer arm of said member 19, when the arm 22 is flexed under the impulse of the inward movement of the rod 27. This operation occurs each time the rod reaches the lowermost portion of the revolution of the wheel, with the result that a sound will be made to signal to the occupants of the automobile that the tire is deflated or partially deflated. By adjusting the rod 27, with the aid of the screw 26, the signal will be given when the tire has become deflated to a predetermined degree, thus preventing running any great distance on a flat tire, with the consequent injury thereto.

What is claimed is:

1. A deflation signaling device comprising a base adapted for attachment to the felly of a wheel, a metallic sounding bar mounted on the base, a flexible arm mounted on the base and having a projection for striking contact with the sounding bar, said flexible arm having a bifurcation with one of the furcations thereof extending away from the sounding bar, and an adjustable actuating rod carried by the said furcation.

2. A deflation signaling device comprising a base, a substantially U-shaped sounding bar having the end of one of its arms secured to the base, a flexible arm secured to the base and being bifurcated with one of the furcations thereof lying within the sounding bar and spaced from the arms thereof, the other furcation having a vertical eye, the first furcation having a projection for striking the free arm of the sounding bar, and an actuating rod adjustable in the said eye.

In testimony whereof we affix our signatures in the presence of two witnesses.

CHARLES H. SEBREE.
GEORGE C. BERLIN.

Witnesses:
F. D. MUMFORD,
OPAL STEWART.